United States Patent [19]

Morse

[11] Patent Number: 5,068,279

[45] Date of Patent: Nov. 26, 1991

[54] LOW FREE FORMALDEHYDE MELAMINE-FORMALDEHYDE DETACKIFIER AND METHOD OF USING

[75] Inventor: Lewis D. Morse, Pittsburgh, Pa.

[73] Assignee: Calgon Corporation, Pittsburgh, Pa.

[21] Appl. No.: 501,466

[22] Filed: Mar. 30, 1990

Related U.S. Application Data

[62] Division of Ser. No. 296,258, Jan. 12, 1989, Pat. No. 4,935,149.

[51] Int. Cl.$^5$ .............................................. C01L 61/24
[52] U.S. Cl. ...................................... 524/593; 524/186;
  524/354; 524/356; 524/592; 528/230; 528/245;
  528/259; 528/264.
[58] Field of Search ............... 524/593, 592, 186, 354,
  524/356; 528/230, 245, 259, 264

[56] References Cited

U.S. PATENT DOCUMENTS

| | | |
|---|---|---|
| 2,345,543 | 3/1944 | Wohnsiedler et al. ............. 524/598 |
| 4,120,840 | 10/1978 | Hurlock et al. ...................... 523/335 |
| 4,127,382 | 11/1978 | Perry ........................................ 8/181 |
| 4,605,478 | 8/1986 | Christenson et al. ............ 204/181.7 |
| 4,612,556 | 9/1986 | Pinot de Moira ................... 503/215 |
| 4,629,572 | 12/1986 | Leitz et al. .......................... 210/714 |
| 4,656,059 | 4/1987 | Mizuno et al. ...................... 427/345 |
| 4,686,047 | 8/1987 | Arots ................................... 210/712 |
| 4,904,393 | 2/1990 | Mitchell et al. ..................... 210/712 |
| 4,913,825 | 4/1990 | Mitchell ............................... 210/705 |

*Primary Examiner*—John Kight, III
*Assistant Examiner*—Sam A. Acquah
*Attorney, Agent, or Firm*—W. C. Mitchell; C. M. Caruso

[57] ABSTRACT

A melamine-formaldehyde detackifer having less than 0.15% free formaldehyde comprises a melamine-formaldehyde polymer detackifier to which has been added a formaldehyde scavenging agent comprising an effective amount of urea, and an enhancer selected from glyoxal and acetylacetone. The use of the low free formaldehyde detackifier is also described.

4 Claims, No Drawings

LOW FREE FORMALDEHYDE MELAMINE-FORMALDEHYDE DETACKIFIER AND METHOD OF USING

This application is a division of application Ser. No. 07/296,258 filed Jan. 12, 1989, now U.S. Pat. No. 4,935,149.

BACKGROUND OF THE INVENTION

Automobile parts, bicycles, toys, appliances and other industrial and consumer articles are conventionally spray painted in areas called spray booths wherein water curtains are employed to wash the air and to remove over-sprayed paint, lacquer or enamel solids. The wash water is then treated to remove paint solids, and the treated water is recirculated.

A water curtain is typically created by pumping water into a trough above the overspray area. The overflow from the trough is then controlled so that a uniform sheet of water falls along the length of the trough and down the booth's wall. Spray nozzles are also commonly used. Droplets of oversprayed paint, emitted by a spray gun, contact and are captured by the water curtain.

A major problem associated with spraying operations concerns the tacky or adhesive nature of the oversprayed coating materials. Solids tend to agglomerate and accumulate on the walls, ceiling and floor of spray areas and to clog water spray equipment, recirculating pumps and the like. Thus, the overspray, or paint mist, captured in the water system of a spray booth must be detackified, or "killed", before it adheres to the walls, piping, etc. of the spray booth. Paint that sticks to spray booth surfaces usually cannot be easily removed from the equipment and tends to build up overtime, which hampers spray booth efficacy.

One solution, which has been found to have practical application to the overspray problem, involves the use of chemicals which, when added to spray booth water, detackify paint solids. A wide variety of chemical formulations have been proposed for this purpose, and have been described in coassigned U.S. patent application Ser. No. 185,720 dated Apr. 25, 1988 of Faust et al, the pertinent portions of which are incorporated by reference. The above enumerated Faust et al application relates to the use of melamine-aldehyde-type polymers, more specifically melamine-formaldehyde polymers, to kill over-sprayed paint. The polymer is used preferably in combination with at least one polymeric coagulant.

DETAILED DESCRIPTION OF THE INVENTION

The Faust et al formulation for example has the disadvantage that it contains excessive free formaldehyde. Since formaldehyde is a potential carcinogenic material its level should be reduced to less than about 0.15%, and preferably to less than 0.1%. A search of pertinent U.S. patent literature produced the following references: U.S. Pat. No. 2,345,543 of Wohnsiedler et al, which describes cationic melamine-formaldehyde resin solutions; U.S. Pat. No. 3,723,058 of Reinhard et al, which describes removal of free formaldehyde from solutions of methylolated carbamate finishing agents and textiles treated therewith; U.S. Pat. No. 3,957,431 of Pal et al, which describes a process for easy care finishing cellulosics having low formaldehyde release; U.S. Pat. No. 4,120,840 of Hurlock et al, which describes the use of phosphorous acid to stabilize quaternized polyacrylamide and U.S. Pat. No. 4,127,382 of Perry, which describes a process for the reduction of free formaldehyde in textile fabrics. The latter patent uses a formaldehyde scavenger, which comprises a heterocyclic compound free of carbonyl groups and containing a NH group. U.S. Pat. No. 4,612,556 of Moira, to a self-contained pressure sensitive copying material, describes the removal of free formaldehyde from a formaldehyde containing suspension of microcapsules by the addition of a compound having a beta dicarbonyl group or a cyclic ketone. U.S. Pat. No. 4,686,047 of Arots describes a process for the detackification of paint spray operations.

None of the above art describes a melamine-formaldehyde detackifier having less than 0.15% free formaldehyde using a formaldehyde scavenging agent selected from the group consisting of urea, acetylacetone, a combination of urea with an enhancer of glyoxal or acetylacetone. Although the inventor has ascertained that the above enumerated compounds provide the desired results, other materials have been tested and found wanting. These materials include, inter alia, phthalimide, dihydroxyacetone, hydrazine, melamine, phosphorous acid, ethylene glycol, baker's yeast, Candida boidini yeast cake, Pseudomonas putida cake, and cyanamid. Only urea, acetylacetone, mixtures thereof and mixtures of urea with glyoxal provide satisfactory results.

As can be seen from the tests, urea and acetylacetone can reduce the level of free formaldehyde down to below 0.15%. The use of glyoxal, however, does not do so. In some cases the urea resulted in the formation of a precipitate. This precipitate is believed to be primarily melamine formaldehyde with some urea formaldehyde. The addition of acetylacetone to urea at levels, where neither alone scavanged enough formaldehyde, greatly prevents precipitate formation and thus results in an effect greater than that of either product alone. This combination, however, is relatively touchy in that a precipitate may form. The use, however, of urea and glyoxal is relatively stable and yields clear solutions without precipitation or cloudiness.

The following examples demostrate the instant invention in greater detail. They are not intended to limit the scope of the invention in any way.

EXAMPLES 1-8

In these examples, one starts with a fine colloidal suspension of melamine-formaldehyde polymer such as Calgon Corporation's CA-289, which has a molecular weight of about 2,200, a pH of about 1.6 to about 2.1 and contains about 8% active melamine-formaldehyde as is further defined in the aforementioned Faust et al application Ser. No. 185,720. To a 50 g aliquot of the resin suspension one adds the amount of scavenger specified in Table I below while stirring at room temperature. The starting urea-formaldehyde suspension had a free formaldehyde content of greater than 0.3% formaldehyde. The times at which the formaldehyde content of the treated material was evaluated are also set forth in the table. The effectiveness of the deteackifier was evaluated as follows: For each product 200 mls of cold tap water was added to an open mouth one pint glass jar equipped with a magnetic stir bar. While stirring the jar at high speed, a carbonate ion source was added so as to provide an alkalinity of 1000 ppm (calcium carbonate basis), 0.5 ml of test product was then added to the jar. As stirring continued, 6 drops of a commercially available white, paint as defined in Table I, were added to the jar. After 30 seconds, 2.0 ml of Calgon polymer 9230 (high molecular weight (5–6,000,000) copolymer of acrylamide and dimethyldiallyl ammonium chloride) was added to the jar. After 30 more seconds, the samples were evaluated. The results are given in Table I.

TABLE I

| Ex. No. | Treatment Remarks | Time | % H$_2$CO Found | Scavenged | |
|---|---|---|---|---|---|
| 1 | 3.0 g acetylacetone; orange; sl. haze; phenol type odor | 3 hrs. 1 day 2 days | 0.16 0.073 0.059 | 47 79 83 | * |
| 2 | 1.0 g urea; turns from opalescent to cloudy | 3 hrs. 24 hrs. 48 hrs. | 0.063 0.027 0.030 | 79 92 91 | * |
| 3 | 1.0 g urea; hvy cloud | 24 hrs. | 0.036 | 89 | * |
| 4 | 2 g urea; opalescent @ 23 days, found hvy cloud | 24 hrs. | 0.035 | 90 | * |
| 5 | 0.5 g urea; hvy. cloud | 24 hrs. 23 days | 0.058 0.02 | 83 94 | * |
| 6 | 0.25 g urea; opalescent | 24 hrs. 17 days | 0.13 0.17 | 62 50 | * |
| 7 | 0.10 g urea; opalescent | 24 hrs. 17 days | 0.21 0.26 | 38 52 | * |
| 8 | 0.05 g urea; opalescent | 24 hrs. 17 days | 0.27 0.29 | 21 15 | * |

*PAINT KILL: good paint kill, dispersion and flocculation with PPG WHITE and PPG high solids clear coat.

EXAMPLES 9–12

In these examples, one starts with the same colloidal suspension as in Examples 1–8, but to the 50 melamine-formaldehyde dispersion one adds acetylacetone as specified in each example. The paint kill jar test was also carried out as in Examples 1–8.

Table II A shows the results of the jar test of Examples 1–8 but using the materials of Example 9–12. The results are reported as 9A–12A corresponding respectively to 9–12, Table II and Table II A.

TABLE II

| Ex. No. | Treatment | Time to Develop Cloud | Days | % H$_2$CO Found | Scavenged |
|---|---|---|---|---|---|
| 9 | 3.0 Acetylacetone; orange; sl. haze; phenol type odor | >110 days | 3 hrs. 1 2 | 0.16 0.073 0.059 | 47 79 83 |
| 10 | 3.0 g Acetylacetone; orange; sl. haze | >104 days | 1 21 51 | 0.07 0.05 0.05 | 79 85 85 |
| 11 | 2.0 g Acetylacetone; orange; slight haze | >104 days | 1 21 51 | 0.1 0.09 0.11 | 71 74 68 |
| 12 | 1.0 g Acetylacetone; orange; | >104 days | 1 | 0.18 | 47 |

TABLE II A

PAINT KILL JAR TEST

| Ex. No. | Tack | Smear | % Float | Floc Description | Final Wtr Clarity |
|---|---|---|---|---|---|
| 9A | — | No | 100 | Excellent | Clear |
| 10A | — | No | 100 | Excellent | Clear |
| 11A | — | No | 100 | Excellent | Clear |
| 12A | — | No | 100 | Excellent | Clear |

EXAMPLES 13–20

In these examples, one starts with the same colloidal suspension as in Examples 1–8, but to the 50 g melamine-formaldehyde dispersion one adds acetylacetone and urea as specified in each example. The paint kill jar test was also carried out as in Examples 1–8 where indicated. In Example 20, 550 g of the urea-formaldehyde dispersion was used. This would be equivalent to 0.38 g acetylacetone and 0.25 g urea had the same 50 gram aliquot been used. The purpose of Example 20 is to show that scaling up 11 fold still provides adequate formadehyde scavenging. As can be seen from Tables III, and III A, less urea and acetylacetaone were used than when the individual components were used in Examples 1–8 and 9–12 respectively. Superior results are obtained. Table III A corresponds to Table III in the same manner as Table II A corresponds to Table II.

TABLE III

| Ex. No. | Treatment | Time to Develop Cloud | Days | % H$_2$CO Found | Scavenged |
|---|---|---|---|---|---|
| 13 | 1.0 g Acetylacetone; stir; add 0.25 g urea | >88 days | 12 26 52 | 0.047 0.066 0.066 | 86 81 81 |
| 14 | 0.5 g Acetylacetone; stir; add 0.25 g urea | 24 hrs. | 2 13 38 | 0.09 0.059 0.09 | 74 83 74 |
| 15 | 0.25 g Acetylacetone; stir; 0.25 g urea | >77 days | 2 13 38 | 0.12 0.1 0.11 | 65 71 68 |
| 16 | 0.13 g Acetylacetone; stir; 0.25 g urea | >77 days | 2 13 38 | 0.14 0.12 0.14 | 59 38 59 |
| 17 | 1.0 g Acetylacetone; stir; add 2.0 g urea | 5 days | | | |
| 18 | 0.75 g Acetylacetone; stir; 0.25 g urea | >32 days | 7 14 | 0.05 0.04 | 74 78 |
| 19 | 0.38 g Acetylacetone; stir; 0.25 g urea | >32 days | 7 14 | 0.06 0.05 | 68 74 |
| 20 | 4.18 g Acetylacetone; stir; 2.75 g urea | >11 days | 10 min. 30 min. 50 min. 90 min. 150 min. 270 min. 420 min. 4 days | 0.26 0.23 0.18 0.19 0.18 0.16 0.14 0.1 | 41 43 55 53 55 60 65 75 |

TABLE III A

PAINT KILL JAR TEST

| Ex. No. | Tack | Smear | % Float | Floc Description | Final Wtr Clarity |
|---|---|---|---|---|---|
| 13A | — | No | 95 | Good | Clear |
| 18A | No | No | 90% 10% suspended | Light & frothy | Clear |
| 19A | No | No | 95% 5% suspended | Light & frothy | Clear |

EXAMPLE 21–31

In Examples 21–23 one again starts with the same colloidal suspensions as in Examples 1–8 but to the 50 g aliquot adds glyoxal as specified. As can be seen no formaldehyde was scavenged. However, when urea was first added stirred for one hour followed by glyoxal additions and again stirred for a quarter hour the amount of urea scavenged was greatly increased. The results are reported in Table IV below. In Table IV A the Paint Kill Jar Test was carried out, again showing the results wherein No. 24A corresponds to No. 24, etc. There is no Paint Kill Jar Test results for Examples 21-31 as glyoxal, per se, scavenged no formaldehyde.

TABLE IV

| Ex. No. | Treatment | Time to Develop Cloud | % H$_2$CO Days | Found | Scavenged |
|---|---|---|---|---|---|
| 21 | 1.2 ml glyoxal, 40% aq. | >59 days | 5 | 0.24 | 0 |
|  |  |  | 17 | 0.24 | 0 |
| 22 | 0.6 ml glyoxal, 40% aq. | >59 days | 5 | 0.24 | 0 |
|  |  |  | 17 | 0.24 | 0 |
| 23 | 0.3 ml glyoxal, 40% aq. | >59 days | 5 | 0.21 | 0 |
| 24 | 0.2 g urea; stir 1 hr; add 0.88 ml 40% glyoxal | >62 days | 7 | 0.031 | 91 |
|  |  |  | 23 | 0.02 | |90 |
| 25 | 1.0 g urea; 0.88 ml 40% glyoxal | >59 days | 1 | 0.02 | |90 |
| 26 | 0.5 g urea; 0.88 ml 40% glyoxal | >59 days | 1 | 0.38 | 80 |
| 27 | 1.0 g urea; 0.44 ml 40% glyoxal | >59 days | 1 | 0.02 | |90 |
|  |  |  | 21 | 0.02 | |90 |
| 28 | 0.5 g urea; 0.44 ml 40% glyoxal | >59 days | 1 | 0.025 | 87 |
|  |  |  | 21 | 0.02 | |90 |
| 29 | 0.2 g urea, but 1.76 ml 40% aq. glyoxal | >62 days | 7 | 0.034 | 90 |
|  |  |  | 23 | 0.02 | |90 |
| 30 | 1.0 g urea; 1.76 ml 40% glyoxal | >59 days | 1 | 0.025 | 87 |
|  |  |  | 21 | 0.02 | |90 |
| 31 | 0.5 g urea; 1.76 ml 40% glyoxal | >59 days | 1 | 0.064 | 66 |
|  |  |  | 21 | 0.03 | 90 |

TABLE IV A

| Ex. No. | Tack | Smear | % Float | Floc Description | Final Wtr Clarity |
|---|---|---|---|---|---|
| 24A | No | Some | 90 | Light | Clear |
| 25A | Yes | Yes | 95 | Tight pack; light; frothy Encapsulated live paint | Clear |
| 26A | Yes (live paint) | Yes | 97 | Light; frothy | Clear |
| 27A | No | Lgt Smear | 97 | Tight pack; light; frothy | Clear |
| 28A | No | No | 90 | Light; frothy | Clear |
| 29A | No | Some | 85 | Light | Clear |
| 30A | No | Lgt Smear | 85 | Bubbles; no floc | Clear |
| 31A | No | Some | 70 | Very loose, tiny floc | Clear |

Although the definitions of the "paint kill jar test" are fully described in the Faust et al application, which was incorporated by reference for the sake of completeness, the definitions are briefly described here. After adding the coagulant and stirring, a froth or "floc" appears on the top of the jar. This floc is coagulated particles of "detackified paint". "Tack" is the tackiness of the paint and is inversely proportional to the effectiveness of the treatment, e.g. no tack means good killing of the paint. The "smear" is readily obtained by smearing the floc between ones thumb and forefinger. Other equivalent tests can be made. The "% float" is the percentage of the floating flocculated material. The "final wtr clarity" is the clarity of the water beneath the floc.

Although specific melamine-formaldehyde dispersions are used in the specific examples, the formaldehyde scavenging properties of my invention are equally applicable to other formaldehyde resin detackifiers. The presently most preferred formulation is a blend of 98.02% melamine-formaldehyde dispersions, 1.49% acetylacetone and 0.49% urea; all percentages being by weight.

What is claimed is:

1. A melamine-formaldehyde detackifier composition comprising a melamine-formaldehyde polymer and a formaldehyde scavenging agent comprising urea and at least one enhancer selected from the group consisting of glyoxal and acetylacetone, the formaldehyde scavenging agent being included in an amount sufficient to reduce the free formaldehyde in the detackifier composition to less than 0.15%.

2. A melamine-formaldehyde detackifier composition as defined by claim 1, wherein the formaldehyde scavenging agent comprises urea and acetylacetone.

3. A melamine-formaldehyde detackifier composition as defined by claim 1, wherein the formaldehyde scavenging agent comprises urea and glyoxal.

4. A melamine-formaldehyde detackifier composition as defined by claim 1, wherein the formaldehyde scavenging agent is included in an amount sufficient to reduce the free formaldehyde in the detackifier composition to less than 0.10%.

* * * * *